United States Patent [19]

Goebel et al.

[11] Patent Number: 4,615,956

[45] Date of Patent: Oct. 7, 1986

[54] METHOD OF TREATING LITHIUM CELLS TO REDUCE START-UP DELAY TIME

[75] Inventors: Franz Goebel, Sudbudy; William T. McHugh, Westwood, both of Mass.

[73] Assignee: GTE Government Systems Corporation, Stamford, Conn.

[21] Appl. No.: 804,561

[22] Filed: Dec. 4, 1985

[51] Int. Cl.[4] ...................... H01M 10/36; H01M 6/14
[52] U.S. Cl. ........................................ 429/50; 429/52; 429/101
[58] Field of Search ...................... 429/48, 50, 101, 52

[56] References Cited

U.S. PATENT DOCUMENTS

| 4,293,622 | 10/1981 | Marincic et al. | 429/101 |
| 4,296,185 | 10/1981 | Catanzarite | 429/48 |
| 4,309,490 | 1/1982 | Chisa et al. | 429/101 |
| 4,448,861 | 5/1984 | Fleischer et al. | 429/50 |
| 4,516,317 | 5/1985 | Bailey | 429/48 |

FOREIGN PATENT DOCUMENTS 5015055  6/1969  Japan ..................... 429/52

Primary Examiner—Donald L. Walton
Attorney, Agent, or Firm—J. Stephen Yeo

[57] ABSTRACT

An electrochemical cell of the type having a lithium anode and a cathode current collector wetted by an electrolyte solution of thionyl chloride and lithium tetrachloroaluminate is treated before storage by applying a reverse current sufficient to deposit lithium on the surface of the anode.

2 Claims, 1 Drawing Figure

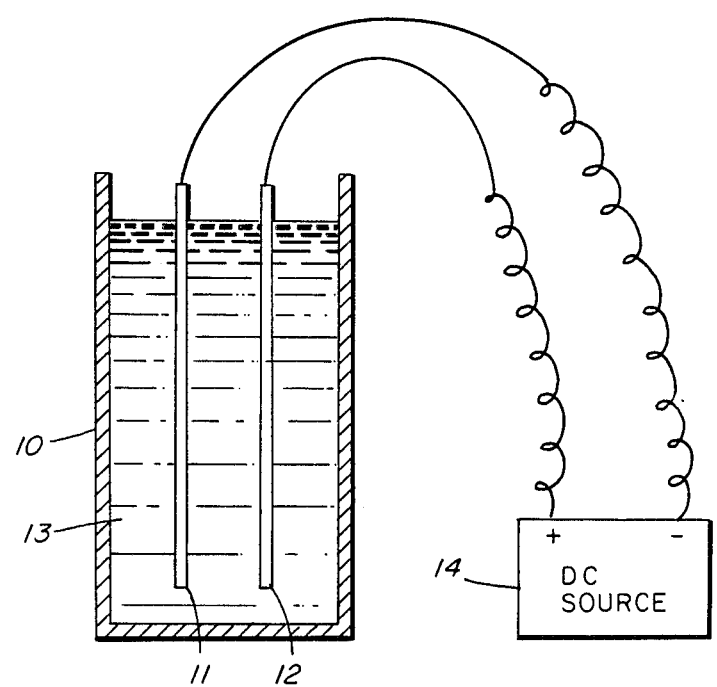

METHOD OF TREATING LITHIUM CELLS TO REDUCE START-UP DELAY TIME

BACKGROUND OF THE INVENTION

This invention pertains to electrochemical cells and more particularly is concerned with treating cells having lithium metal anodes with oxyhalide-type electrolytes.

Such cells are capable of being stored for extended time periods without significant degradation of their capacity. One reason for the long shelf life is that the surface of the lithium metal anode starts to oxidize almost immediately upon contact with the oxyhalide electrolyte. A dense oxidizing film forms on the anode surface which protects the anode from further chemical corrosion or oxidization. This phenomenon is known as passivation. When the cell is placed under load after a period of storage there is a delay before the cell voltage raises to an acceptable level. Apparently, the film which protects the anode during storage prevents a sufficient number of lithium ions from going into solution until a discharge current flows for a time. The delay time varies from seconds to hours, depending on the cell construction and storage conditions with high rate cell particularly affected. The delay in reaching operating voltage is a problem for those applications where almost instantaneous electrical power is required of a cell.

A very efficient type of a primary cell has a lithium metal anode and an electrolyte solution of thionyl chloride ($LiSOCl_2$) and lithium tetrachloroaluminate ($LiAlCl_4$). It is known to partially discharge such cells before storage as the current flow causes $SO_2$ to be generated from the reduction of thionyl chloride. The $SO_2$ reduces start-up delay time. The predischarge, however, depletes the capacity of the cell.

It is an object of the invention to treat lithium metal anode cells to reduce start-up delay time without depletion of cell capacity.

SUMMARY OF THE INVENTION

Briefly, an electrochemical cell of the type having a lithium anode and a cathode current collector wetted by a solution of thionyl chloride and lithium tetrachloroaluminate is treated before storage by applying a reverse current sufficient to deposit lithium upon the surface of the anode.

BRIEF DESCRIPTION OF THE DRAWING

The single FIGURE is a schematic representation of an electrochemical cell being treated according to the method of the invention.

DESCRIPTION OF THE INVENTION

Turning to the drawing, there is seen a schematic representation a primary electrochemical cell 10 having a lithium metal anode 11 and a cathode current collector 12 which may include particulate carbon. An electrolyte 13 including a solution of thionyl chloride and lithium tetrachloroaluminate wets the two electrodes 11, 12. One such cell is described in U.S. Pat. No. 4,539,273. As a feature of the invention, prior to storage of the cell, an externally generated direct current voltage from d.c. source 14 is applied between the electrodes, with positive polarity on the cathode current collector 12 and negative polarity on the anode 11. The voltage is sufficient to cause a reverse current flow between the electrodes 11,12, i.e., in a direction opposite to that experienced during normal discharge.

Primary cells are not dependent upon receiving an electrical charge to reach their capacity. Some primary cells, such as those having a paste electrolyte, may be briefly regenerated by passing a reverse current between electrodes. Apparently, such reverse current disperses reaction products which were formed about the cell's cathode electrode. This is not the situation with the present method. It is believed that upon reverse current flow, lithium derived from the electrolyte salt is electrochemically deposited upon the anode which increases the active anode surface area [by several orders of magnitude], and as a result reduces the imposed current density in the same proportion. There may be other effects not yet analyzed.

EXAMPLE

Six C-size cells having lithium anodes, porous carbon cathode current collectors, and an electrolyte solution of thionyl chloride with lithium tetrachloroaluminate were provided. The cells had bobbin electrode construction.

Five cells were exposed to reverse current in the range of 1 $mA/cm^2$ to 10 $mA/cm^2$ of geometrical anode surface area, which is about 28 $cm^2$ for each cell. Geometrical surface area is the two-dimensional area calculated by parameters of the anode. The charging times ranged from 2 minutes to 10 minutes. The coulombic charge density ranges from 10 mA $cm^2 \times$ Min. to 51.8 mA $cm^2 \times$ Min. based on geometrical anode surface area available within the test cells. One cell was used as a control without being treated with reverse current. All six cells were then stored for 2 months at 50° C. After storage, the cells were allowed to cool at room temperature for 24 hours.

As seen in the following table, the cell with the highest coulombic value had the shortest delay time. On the other hand, the control cell which was not treated with reverse current charge had the longest delay time of 39 seconds.

TABLE 1

| Cell No. | Reverse Current (mA) | Current/Anode Area ($mA/cm^2$) | Time (min) | $mA/cm^2 \times$ Min | Delay Time (sec) |
| --- | --- | --- | --- | --- | --- |
| 3 | 140 | 5 | 10 | 50 | 5 |
| 4 | 280 | 10 | 2 | 20 | 8 |
| 2 | 140 | 5 | 5 | 25 | 12 |
| 1 | 56 | 2 | 10 | 20 | 16 |
| 6 | 28 | 1 | 10 | 10 | 17 |
| 5 | 0 | 0 | 0 | 0 | 39 |

Delay time is defined as the time a cell under a constant 1 mA load takes to produce an output voltage of at least 3.0 volts. Average open circuit voltage of the six test cells was 3.68 volts.

The method of treating cells with reverse current significantly reduces delay time. It will be apparent to those skilled in the art that other current levels and time periods may be used within the scope of the invention. For example, a higher current level over a shorter time period would be preferred from a production standpoint.

We claim:

1. A method of reducing voltage delay time of electrochemical cells of the type having a lithium metal anode and a cathode current collector wetted by an electrolyte solution of thionyl chloride and lithium tetrachloroaluminate, comprising the steps of:

provding a cell prior to storage;

applying negative voltage to said lithium metal anode and positive voltage to said cathode current collector at a level sufficient to cause a current flow opposite to the current flow of said cell during normal discharge; and maintaining said current flow at a level and time sufficient to deposit lithium metal to the surface of said lithium metal anode.

2. The method of claim 1 wherein said current flow is in the range of 1 to 10 mA per square centimeter of geometrical anode surface area.

* * * * *